United States Patent [19]

Larsen

[11] 3,787,319

[45] Jan. 22, 1974

[54] AMINE/PHOSPHATE COMPOSITION USEFUL AS CORROSION AND SCALE INHIBITOR

[75] Inventor: Arthur Lee Larsen, Denver, Colo.

[73] Assignee: Marathon Oil Company, Findlay, Ohio

[22] Filed: Oct. 18, 1971

[21] Appl. No.: 190,266

Related U.S. Application Data

[62] Division of Ser. No. 812,847, April 2, 1969, abandoned.

[52] U.S. Cl............... 252/8.55 E, 21/2.5, 21/2.7, 106/14, 166/244 C, 252/389, 260/924
[51] Int. Cl. ............................................ C23f 11/16
[58] Field of Search....... 252/8.55 E, 389 A; 21/2.5, 21/2.7; 260/924

[56] References Cited
UNITED STATES PATENTS

| | | | |
|---|---|---|---|
| 2,891,909 | 6/1959 | Hughes | 252/8.55 |
| 2,848,414 | 8/1958 | Chenicek | 252/389 X |
| 3,033,889 | 5/1962 | Chiddix et al. | 252/389 X |
| 3,331,896 | 7/1967 | Eiseman et al. | 260/980 |

*Primary Examiner*—Herbert B. Guynn
*Attorney, Agent, or Firm*—Joseph C. Herring et al.

[57] ABSTRACT

A composition useful as a corrosion and scale inhibitor is obtained by reacting an N-secondary alkyl alkylene diamine (e.g., contains an average of eight–20 carbon atoms in the alkyl group and two–four carbons atoms in the alkylene group) and a phosphate ester, obtained for example by reacting about equal molar amounts of polyphosphoric acid and a condensation product of an aliphatic primary alcohol (preferably contains three–six carbon atoms) and at least 1 mole (preferably 1–10 moles) of an alkylene oxide (preferably ethylene oxide). Final reaction product can have a pH of 5–9.

10 Claims, No Drawings

AMINE/PHOSPHATE COMPOSITION USEFUL AS CORROSION AND SCALE INHIBITOR

CROSS REFERENCE TO RELATED APPLICATION

This is a divisional of my copending patent application, Ser. No. 812,847, filed Apr. 2, 1969, now abandoned.

BACKGROUND OF THE INVENTION

Corrosion control in the petroleum industry is obtained in general by changing the environment and/or by forming a protective barrier on the corroding object. Corrosion inhibitors are generally of the neutralizing type or the film-forming type. Neutralizing inhibitors function by neutralizing the active corrodants in the system whereas film-formers are believed to function by placing a protective barrier between the metal and the corrosive environment.

Film-forming inhibitors used in greatest quantity in the oil industry include the fatty and heterocyclic nitrogen-containing compounds, such as the amine-acid complexes and the imidazoline derivatives. In particular, fatty amines and particularly the diamines combined with fatty acids such as resin acids and tall oil acids, oxidized petroleum fractions and naphthenic acids produce good film-forming corrosion inhibitors.

Applicant has discovered a novel composition. It is useful, inter alia, as a film-forming corrosion inhibitor, scale inhibitor, etc. The composition is obtained by reacting an N-secondary-alkyl alkylene diamine and a phosphate ester.

DESCRIPTION OF THE INVENTION

Examples of useful phosphate esters include those found in U.S. Pat. No. 3,331,896 to Eiseman, Jr. et al. Preferred phosphate esters are obtained by reacting about equal molar amounts of polyphosphoric acid and the condensation product of an aliphatic primary alcohol (contains one to about 12 carbon atoms and preferably contains about three to about six or more carbon atoms) and at least about one mole, preferably about one to about 10 moles, of an alkylene oxide, preferably containing about two to about four carbon atoms, such as ethylene oxide. The polyphosphoric acid is composed of an equilibrium mixture of orthophosphoric, pyrophosphoric, and higher linear phosphoric acids. Commercially available polyphosphoric acids range from about 110% to about 120% $H_3PO_4$ and contain about 80% to about 86.5% $P_2O_5$. A more detailed description of useful polyphosphoric acids is found in U.S. Pat. No. 3,331,896 to Eiseman, Jr. et al. For purposes of this invention, 1 mole of polyphosphoric acid is defined as 1 mole of $P_2O_5$ as present in polyphosphoric acid.

Examples of N-secondary-alkyl alkylene diamines are found in U.S. Patent No. 3,398,196 to Fuller, Jr. et al. Particularly useful diamines are identified by the formula:

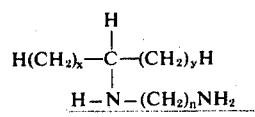

wherein $x$ and $y$ are positive integers having a sum of about six to about 30 and $n$ is a positive integer within the range of about two to about four and preferably is three. The polyamines are preferably oleophilic and contain substantially saturated alkyl chains. Additional examples of useful diamines include those found in "Product Data Bulletin," Bulletin No. 68-3, under the title "Beta Amines and Derivatives," Armour Industrial Chemicals, Box 1805, Chicago, Illinois. A particularly useful N-secondary-alkyl alkylene diamine is one wherein the alkyl group contains an average of about 10 to about 20 aliphatic carbon atoms.

The diamine and the phosphate ester are reacted in sufficient amounts to give a resulting pH of about 5 to about 9 and more preferably about 6.5 to about 7.5. A solvent compatible with the phosphate ester and diamine can be utilized during the neutralization to facilitate mixing, e.g., isopropyl alcohol, or a similar alcohol. Reaction temperature can preferably be within the range of about 60° F to about 100° F and more preferably about 80°F to about 90°F.

Compositions of this invention are especially useful as corrosion inhibitors in producing oil and gas wells. They are also useful as corrosion inhibitors in both liquid and gas flow lines, gas-lift wells, pumping operations, and any like operation. The composition may be added continuously by means of a pump, lubricator, etc. to the casing-tubing annulus, flow lines, etc. If the casing annulus of a well is blocked, that is, packed off from the tubing, the inhibitor can be added to the tubing; the production is preferably stopped during this type of addition. Or, the inhibitor can be added as a solid stick (i.e., the composition can be incorporated along with binders, wetting agents, or other compatible agents, to form a solid article) and placed in the tubing or casing where it melts or dissolves in the well fluids to give the desired protection to the well.

In addition, the compositions of this invention can be "squeezed" into the formation—thereafter the composition is flushed out of the formation when the well is produced. The latter method can impart a reasonably long protection, e.g., 6 to 12 months to the well bore. However, the invention is not recommended where barium sulfate scale is principally characteristic of fouling production.

These compositions are useful to form protective films on any metal. Yellow metals can be coated with the composition to give protection against corrosion, scale, etc. Other metals including carbon steel, stainless steel, etc. can also be effectively coated with these compositions.

The composition is useful in amounts sufficient to form a mono-molecular layer on the surface of the metal to be protected. For example, the article can be immersed in a dilute solution containing about 1 percent to about 20 percent or more by weight and preferably about 5 percent to about 10 percent by weight of the composition. Concentration of about 2 ppm. to about 500 ppm. or more and preferably about 5 ppm. to about 100 ppm. of the composition in a major portion of the corrosive or sealing medium is useful to protect equipment, e.g., tubing and casing in a well.

The following examples are presented to teach specific working embodiments of the invention. These examples are not intended to limit the invention in any way. Rather, all equivalents obvious to those skilled in the art are intended to be incorporated into the scope

EXAMPLE I

An oil well producing about 19 parts of water to about 1 part of crude oil has a corrosion rate of 5 mills per year with a pitting tendency indicated by the following Corrator reading (Corrator is a tradename of Magna Corporation, Santa Fe Springs, California):

CORRATOR READING

| 100 scale | 10 scale |
|---|---|
| 20 millivotes | 10 millivotes |
| A:−3 | A:−2 |
| B:+12 | B:+6.5 |

The above data were determined after the well was cleaned by bailing and then the well was pumped for 5 days and the Corrator probe was placed in a flow line. The 100 scale reading indicates a pitting tendency of 15; thus a severe pitting condition is present. The well was treated with 5 gallons of an aqueous solution containing 25 percent tap water, 25 percent isopropanol, and 50 percent of a chemical composition obtained by neutralizing a monophosphate ester (obtained by reacting equal molar amounts of polyphosphoric acid and the condensation product obtained by reacting 1 mole of N-butyl alcohol and 1 mole of ethylene oxide) with Duomene L-11 (a tradename of Armour Industrial Chemicals, Chicago, Illinois, identifying an N-secondary-alkyl trimethylene diamine wherein the alkyl group contains an average of about 11 to about 14 carbon atoms) to a pH of about 7.0 at 90° F. The resulting mixture contains about equal weight amounts of the isopropyl alcohol, the monophosphate ester, and the Duomene L-11 and the residue is water. The aqueous solution is circulated for 2 hours through the annulus of the well and through the tubing. A reading on a Corrator placed in a circulating line indicated that the corrosion rate was now 0.7 mills per year; the pitting tendency was drastically reduced, as evidenced by the following data:

CORRATOR READING

| 100 scale | 10 scale |
|---|---|
| 20 millivotes | 10 millivotes |
| A:+1.0 | A:+1.0 |
| B:+2.0 | B:+1.2 |

The well was placed back on production. After 2 weeks of production, the Corrator reading was made again. The corrosion rate calculated from the Corrator readings indicated a 0.0 mills per year corrosion rate. A continuous check of the corrosion rate within this well indicated that 100 percent corrosion protection is obtained by circulating 5 gallons of this chemical composition for 2 hours every month.

EXAMPLE II

To test the scale inhibition characteristics of the compositions of this invention, an apparatus was used which comprises rotating a heated metal rotor in a water solution containing the scale-forming mineral. This test procedure is described in an article by F. W. Jones "Chemical Inhibition of Mineral Scales," presented at The National Association of Corrosion Engineers, South Central Region Annual Conference, Tulsa, Oklahoma, October, 1960. The heated metal rotor is easily weighed, coated, and cleaned. The rotor assembly is made of 3/8 inch tubing and the disk or rotor is perforated metal (sheet metal) welded at the end of the tubing. Cylindrical electrical heaters (100 watt) are mounted inside the rotor tube. The rotor is rotated at a velocity usually equivalent to about 10 feet per minute at the rotor edge. The aqueous liquid containing the scale-forming mineral, 250 milliliters, is contained in a 400 milliliter pyrex glass beaker and a thermometer is extended into the liquid in the beaker to record the temperature. The compositions of this invention are tested for $CaCO_3$ scale inhibition at 180° F. in an aqueous solution containing tap water, 3 grams per liter of $CaCO_3$, 5 percent by weight of NaCl and the liquid saturated with $CO_2$. The rotors are immersed in the compositions indicated in Table 1 for 10 minutes at ambient temperature, are then washed with tap water to remove excess chemical and are then placed in the aqueous solution and rotated for 4.5 hours at a temperature of 185° F. Thereafter, the rotors are cooled for 1/2 hour and are dried and weighed. The percent inhibition against scale adhering to the rotor is determined by weighing a control rotor (not treated with the composition) before and after scaling, subtracting from this difference the amount of scale adhered to a test rotor (i.e., a rotor treated with the composition of this invention) and dividing this difference by the scale adhered to the control rotor. Table 1 contains the composition used to coat the rotor and the percent inhibition against scale:

TABLE 1

| Sample No. | Chemical Composition | % Inhibition against scale |
|---|---|---|
| A | 50% isopropanol and 50% of the composition obtained by neutralizing the monophosphate ester of Example I to pH of 6.0 with Duomene L-15 (same as Duomene L-11 except the alkyl group contains an average of about 15–20 carbon atoms), this composition diluted to 20% in Stoddard solvent | cc 69 |
| B | Same as A except water replaces the Stoddard solvent | 64 |
| C | Same as A | 94 |
| D | Same as A except Duomene L-11 is substituted for Duomene L-15 and 1% of the dimagnesium salt of ethylene diamine tetracetic acid is incorporated into the solution | 99 |
| E | Same as A except Duomene L-11 is substituted for Duomene L-15 and neutralized to pH of 7.0 and 1% of a nonionic wetting agent is added to the solution (reaction product of 1 mole octyl phenol and 15 moles of ethylene oxide) | 82 |
| F | 50% isopropanol and 50% of the composition obtained by neutralizing a monophosphate (obtained by reacting equal molar amounts of polyphosphoric acid and the condensation product of one mole of iso-amyl alcohol and 4.0 moles of ethylene oxide) to a pH of 6.0 with Duomene L-11, this composition diluted to 20% with water | 91 |
| G | Same as F except the monophosphate contains 5.1 moles of ethylene oxide and Duomene L-15 is substituted for Duomene L-11 to neutralize to a pH of 7. | 97 |

What is claimed is:

1. A method of protecting a metal surface from corrosion comprising depositing at least a mono-molecular layer on the surface of the metal of the product obtained by neutralizing to a pH of about 5 to about 9 at a temperature less than about 100° F, 1. a phosphate ester obtained by reacting about equal molar amounts of polyphosphoric acid (1 mole of polyphosphoric acid is defined as 1 mole of $P_2O_5$ as present in polyphosphoric acid) and a condensation product of an aliphatic primary alcohol containing about one to about 12 carbon atoms and about 1 to about 10 moles of an alkylene oxide containing about two to about four carbon atoms, with 2. an N-secondary alkyl alkylene diamine wherein the alkyl group contains an average of about seven to about 31 carbon atoms and the alkylene group contains about two to about four carbon atoms.

2. The method of claim 1 wherein the alcohol contains about three to about six carbon atoms.

3. The method of claim 1 wherein the alkylene grouping of the diamine is trimethylene.

4. A method of inhibiting corrosion of carbon steel wherein the carbon steel is corroded in the presence of a corrosive fluid present in oil and gas wells, the process comprising incorporating in the fluid sufficient amounts to inhibit the corrosion of the carbon steel of a phosphorous containing compound obtained by neutralizing to a pH of about 5 to about 9 at a temperature of less than about 100° F 1. a phosphate ester obtained by reacting about equal molar amounts of polyphosphoric acid (1 mole of polyphosphoric acid is defined as 1 mole of $P_2O_5$ as present in polyphosphoric acid) and a condensation product of an aliphatic primary alcohol containing about one to about 12 carbon atoms and from about 1 to about 15 moles of an alkylene oxide containing about two to about four carbon atoms, with 2. an N-secondary alkyl alkylene diamine wherein the alkyl group contains an average of about seven to about 31 carbon atoms and the alkylene group contains about two to about four carbon atoms.

5. The process of claim 4 wherein about 2 to about 500 ppm. of the phosphorous containing compound is incorporated into the corrosive fluid.

6. The process of claim 4 wherein the alkyl group of the diamine contains an average of about 10 to about 20 carbon atoms.

7. The process of claim 4 wherein the alcohol contains about three to about six carbon atoms.

8. The process of claim 4 wherein the phosphate ester is neutralized to a pH of about 6.5 to about 7.5.

9. The process of claim 4 wherein about 1 to about 10 moles of the alkylene oxide is condensed with the alcohol.

10. The process of claim 9 wherein the alkylene oxide is ethylene oxide.

* * * * *